United States Patent [19]

Uemoto et al.

[11] Patent Number: 4,952,767
[45] Date of Patent: Aug. 28, 1990

[54] EDM WITH AN ELECTROMAGNETIC SHIELD OF HOLLOW FERRITE BEADS FLOATING ON DIELECTRIC FLUID

[75] Inventors: Kazuhiko Uemoto; Toshiaki Tanaka, both of Aichi, Japan

[73] Assignee: Mitsubishi Denki Kabushiki Kaisha, Tokyo, Japan

[21] Appl. No.: 416,089

[22] Filed: Oct. 2, 1989

[30] Foreign Application Priority Data

Oct. 3, 1988 [JP] Japan .................. 63-247338
Nov. 28, 1988 [JP] Japan .................. 63-298060

[51] Int. Cl.⁵ .................. B23H 1/00; B23H 1/02; B23H 1/08
[52] U.S. Cl. .................. 219/69.11; 174/35 MS; 219/69.14
[58] Field of Search .................. 174/35 R, 36, 35 MS; 361/424; 219/68, 69.1, 69.14, 69.11; 204/129.1

[56] References Cited

U.S. PATENT DOCUMENTS

| | | | |
|---|---|---|---|
| 3,009,119 | 11/1961 | Slater et al. | 174/35 R |
| 4,670,347 | 6/1987 | Lasik et al. | 174/35 MS |
| 4,703,133 | 10/1987 | Miller | 361/424 |

FOREIGN PATENT DOCUMENTS

| | | | |
|---|---|---|---|
| 54-69301 | 6/1979 | Japan . | |
| 54-69302 | 6/1979 | Japan . | |
| 58-28423 | 2/1983 | Japan | 219/69.11 |
| 61-293722 | 12/1986 | Japan . | |
| 297032 | 12/1987 | Japan | 219/69.12 |
| 2159822 | 12/1985 | United Kingdom | 174/35 R |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

An electric discharge machining apparatus having a shielding mechanism for prevention of an occurrence of radio interference due to electromagnetic waves which are generated during an electric discharge machining operation. The shielding mechanism comprises a plurality of shielding floats at least the surface of which are made of a magnetic material high in magnetic permeability. The floats covers a surface of a machining solution contained in a machining reservoir made of a magnetic material high in magnetic permeability, in such a manner that the shielding floats are in contact with a side wall of the machining reservoir.

6 Claims, 3 Drawing Sheets

4,952,767

EDM WITH AN ELECTROMAGNETIC SHIELD OF HOLLOW FERRITE BEADS FLOATING ON DIELECTRIC FLUID

BACKGROUND OF THE INVENTION

The present invention relates to an electric discharge machining apparatus, and more particularly to prevention of the occurrence of radio interference due to electromagnetic waves which are generated during an electric discharge machining operation.

FIG. 1 is a sectional view showing a conventional electric discharge mmachining apparatus as disclosed, for instance, by Japanese Patent Application (OPI) No. 15300/1983 (the term "OPI" as used herein means "unexamined published application"). In FIG. 1, reference numeral 1 designates a machining reservoir; 2, a machining level block on the bottom of the machining reservoir 1; 3, a workpiece on the machining level block 2; 4, a machining electrode held above the workpiece 3 (hereinafter referred to merely as "an electrode", when applicable); 5, a machining solution in the machining reservoir 1; 6, a machining power unit provided outside the machining reservoir 1; 7, electric power supplying feeder lines through which the machining power unit is connected to the machining reservoir 1 and the electrode 4; and 8, a shield room housing the machining reservoir 1 and the machining power unit 6, the shield room being grounded.

In the conventional electric discharge machining apparatus thus constructed, the workpiece 3 and the electrode 4 are disposed in the machining solution with a small gap therebetween, and a pulse voltage is applied across the workpiece 3 and the electrode 4 through the feeder lines 7 by the power unit 6. As a result, electric discharge occurs between the workpiece 3 and the electrode 4; that is, machining current flows in a closed loop consisting of one of the feeder lines 7, the electrode 4, the workpiece 3 and the other feeder line 7, thus machining the latter 3. When the electric discharge occurs, or the pulse voltage rises or falls, electromagnetic waves are radiated from the gap between the workpiece 3 and the electrode 4, or from the electric power supplying feeder lines 7. If there is, for instance, an NC machine tool, or a signal receiving device such as a radio set or television set around the electric discharge machining apparatus, the electromagnetic waves may cause the NC machine tool to operate erroneously or cause noises in the signal receiving device; that is, they may cause radio interferences. However, as was described above, the machining reservoir 1 containing the workpiece 3 and the electrode 4 and the power unit 6 are housed in the shield room 8, and therefore the electromagnetic waves radiated from the gap between the workpiece 3 and the electrode 4, or from the feeder lines 7, are shielded by the shield room 8, so as not to leak outside. That is, the radio interference by the electromagnetic waves is prevented.

FIG. 2 is a sectional diagram showing another example of a conventional electric discharge machining apparatus which has been disclosed by Japanese Patent Application (OPI) Nos. 69301-1979, 69302/1979 and 293722/1986. In FIG. 2, parts corresponding functionally to those already described with reference to FIG. 1 are designated by the same reference numerals. Further in FIG. 2, reference numeral 9 designates an electrode servo shaft for driving the electrode 4; and 10, an electrically conductive cover laid over the machining reservoir 1 in such a manner that the electrode servo shaft 9 penetrates the cover 10.

In the conventional electric discharge machining apparatus shown in FIG. 2, electromagnetic waves radiated from the gap between the workpiece 3 and the electrode 4 is shielded by the electrically conductive cover 10, so that they may not leak outside the machining reservoir 1; that is, radio interference due to the electromagnetic waves is prevented.

In the first example of the conventional electric discharge machining apparatus, the machining reservoir 1 and the machining power unit 6 are housed in the shield room 8. Therefore, the electric discharge machining apparatus is disadvantageous in that installation of the shield room 8 may occupy a relatively large space and the installation must be carried out by a person skilled in the art, with the result that the electric discharge machining apparatus is high in running cost.

In the second example of the conventional electric discharge machining apparatus, the machining reservoir 1 is covered with the electrically conductive cover 10 which is penetrated by the electrode servo shaft 9 with the electrode 4. Therefore, the electric discharge machining apparatus suffers from a difficulty that, when a mmachining operation is carried out with the electrode servo shaft 9 moving in a direction perpendicular to its axial line, the movement range of the shaft 9 is restricted due to the provision of the cover 10. In order to shield the electromagnetic waves with the cover, the cover must be designed so that it is kept at the same potential as the machining reservoir 1; that is, it is kept grounded at all times. In addition, the cover must be so designed as to prevent the leakage of electromagnetic waves from a member which is provided to open and close the cover 5. Consequently, the electric discharge machining apparatus is also disadvantageous in that the cover is unavoidably intricate in construction.

SUMMARY OF THE INVENTION

Accordingly, an object of this invention is to eliminate the above-described difficulties accompanying a conventional electric discharge machining apparatus. More specifically, an object of the invention is to provide an electric discharge machining apparatus simple in construction and low in manufacturing cost in which electromagnetic waves generated during electric discharge machining are shielded in the machining reservoir, to thereby prevent the occurrence of radio interference.

The foregoing object of the invention has been achieved by the provision of an electric discharge machining apparatus, in which, according to one aspect of the invention, a machining reservoir in which a machining electrode and a workpiece to be machined are placed is made of a magnetic material high in magnetic permeability, and a number of shielding floats at least the surfaces of which are made of a magnetic material high in magnetic permeability are floated on the machining solution in the machining reservoir in such a manner that they are in contact with one another and in contact with the side walls of the machining reservoir and covers the entire surface of the machining solution in the machining reservoir.

An electric discharge machining apparatus, according to another aspect of the invention, which comprises: a plurality of electromagnets which are disposed on the inner side walls of the machining reservoir in such a manner that they flush with the surface of the machining solution in the machining reservoir, and the surfaces of the electromagnets are at the same potential a the machining reservoir; an electromagnet control device for controlling the on-off operation and the magnetic force of each of the electromagnets; and a number of shielding floats which are electrically conductive and ferromagnetic, the shielding floats being floated on the machining solution in said machining reservoir in such a manner as to cover the entire surface of the machining solution in the machining reservoir.

In the electric discharge machining apparatus according to one aspect of the invention, a number of shielding floats at least the surfaces of which are made of a material high in magnetic permeability are floated on the surface of the machining solution in the machining reservoir which is made of a material high in magnetic permeability in such a manner that the shielding floats are in contact with one another and the side walls of the machining reservoir, so that the inside of the machining reservoir is magnetically shielded by the magnetic shielding means made up of the machining reservoir and the number of shielding floats in contact with it. Therefore, the magnetic shielding means absorbs the electromagnetic waves radiated from the gap between the electrode and the workpiece during machining; that is, the leakage of the electromagnetic waves from the machining reservoir is prevented.

In the electric discharge machining apparatus according to another aspect of the invention, a number of shielding floats of electrically conductive and ferromagnetic material are floated on the surface of the machining solution in the machining reservoir in such a manner that they cover the entire surface of the machining solution, and a plurality of electromagnets are disposed on the inner walls of the machining reservoir in such a manner that they are flush with the surface of the machining solution and are at the same potential as the machining reservoir. The electromagnet control device is operated to cause the electromagnets to form weak magnetic fields around them thereby to excite the shielding floats covering the entire surface of the machining solution. As a result, the shielding floats are brought into contact with one another, so that the machining reservoir, the electromagnets, and the shielding floats are held at the same potential; that is, the inside of the machining reservoir is electromagnetically shielded. Thus, the electromagnetic waves radiated from the gap between the electrode and the workpiece during machining is shielded inside the machining reservoir.

DESCRIPTION OF THE PREFERRED EMBODIMENTS

Figure 1:
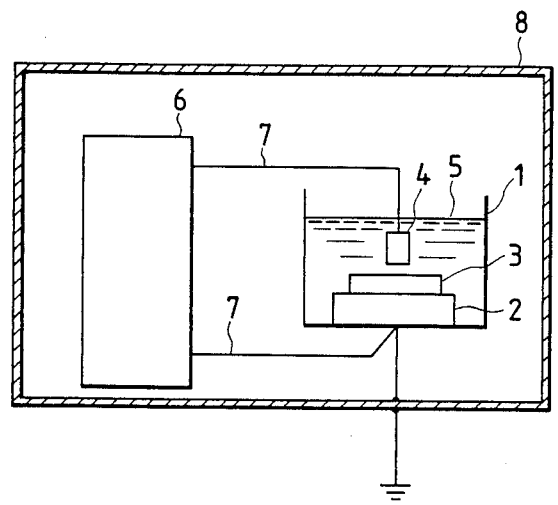
FIG. 1 is a sectional view showing one example of a conventional electric discharge machining apparatus.
Figure 2:
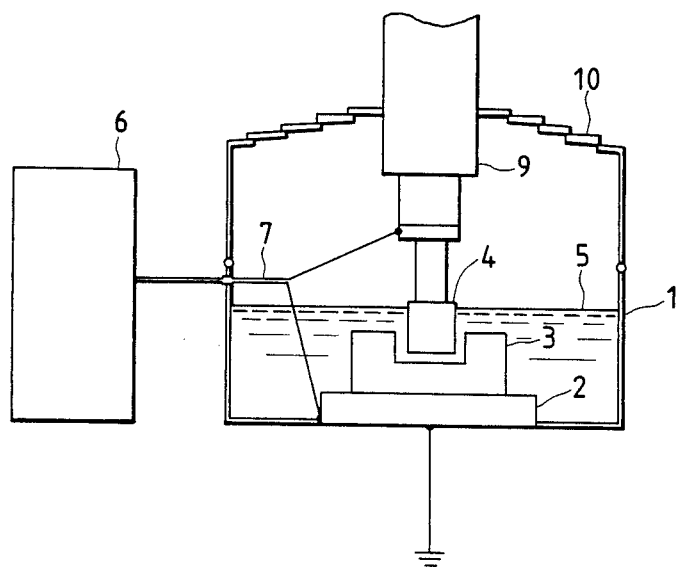
FIG. 2 is a sectional view showing another example of the conventional electric discharge machining apparatus.
Figure 3:
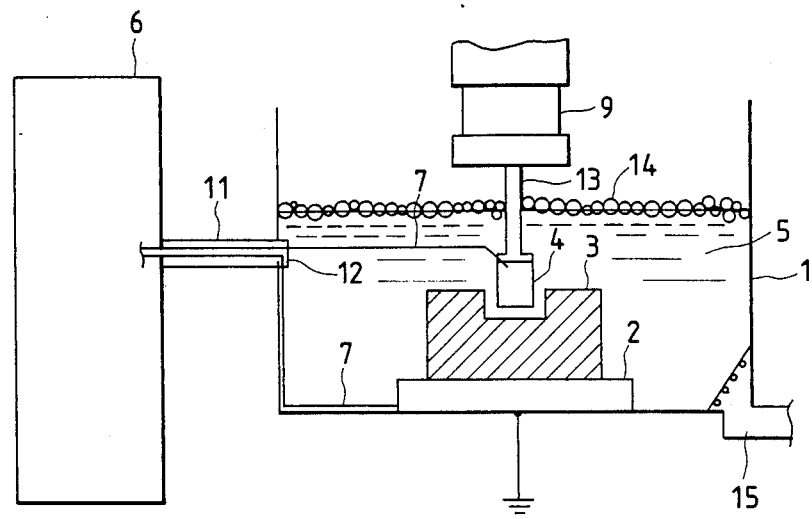
FIG. 3 is a sectional view showing a first embodiment of this invention.

FIG. 3 is a sectional view showing a first embodiment of the present invention. In FIG. 3, parts corresponding functionally to those which have been already described with reference to FIGS. 1 and 2 are therefore designated by the same reference numerals. Further in FIG. 3, reference numeral 1 designates a machining reservoir made of a magnetic material high in magnetic permeability; 5, an insulating machining solution; 11, a feeder shield connected between the machining power unit 6 and the machining reservoir 1 to shield the electric power supplying feeder lines 7 laid between the machining reservoir 1 and the power unit 6; 12, a packing sealing the feeder line inlet of the machining reservoir 1 into which the feeder shield 11 is inserted; 13, an electrode shank made of an insulating material, for connecting the electrode 4 to the electrode servo shaft 9; 14, shielding ferromagnetic floats, namely, ferrite beads of ferromagnetic material, 4 mm to 5 mm in diameter, the ferrite beads being hollow so as to be floated on the machining solution; and 15, a machining solution discharging outlet formed in the bottom of the machining reservoir 1.

The operation of the electric discharge machining apparatus thus constructed will be described with reference to FIG. 3.

The electrode 4 is held in the machining solution 5 with a small gap against the workpiece 3. Under this condition, the ferrite beads 14 are floated on the machining solution in such a manner that the ferrite beads are in contact with one another and in contact with the side walls of the machining reservoir 1; that is, the ferrite beads 14 covers the entire surface of the machining solution 5; more specifically the ferrite beads 14 separate the surface of the machining solution from the outside space. In this case, the ferrite beads in contact with one another are magnetically connected to the machining reservoir 1, thus forming a closed magnetic circuit with the machining reservoir 1; that is, the inside of the machining solution 5 is magnetically shielded.

When a pulse voltage from the power unit 6 is applied across the electrode 4 and the workpiece 3 through the feeder lines 7, a spark discharge occurs in the gap between the workpiece 3 and the electrode 4; that is, machining current flows in a loop consisting of one of the feeder lines 7, the electrode 4, the gap, the workpiece 3, and the other feeder line 7, thus machining the workpiece. During the electric discharge machining operation, electromagnetic waves are radiated from the gap between the electrode 4 and the workpiece 3 and from the feeder lines 7. The electromagnetic waves thus radiated are shielded and absorbed by the magnetic shield means made up of the number of ferrite beads 14 and the feeder shield 11. Thus, no electromagnetic waves are radiated outside the machining reservoir 1. The reason why the ferrite beads are used as the shielding floats resides in that ferrite, being ferromagnetic material, is most effective in shielding electromagnetic waves.

The electromagnetic waves may return to the machining power unit 6 through the feeder lines 7; however, the electromagnetic waves are shielded by the housing of the machining, or other members such as insulating transformers and filters, so that the radiation of the electromagnetic waves is reduced to the extent that other equipment around the electric discharge machining apparatus is not affected thereby.

Figure 4:
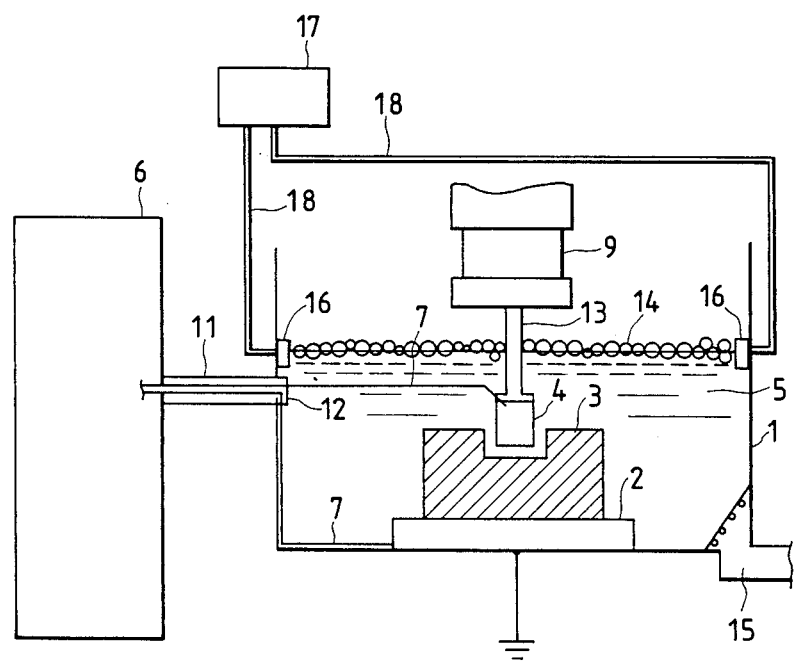
FIG. 4 is a sectional view showing a second embodiment of the invention.
Figure 5:
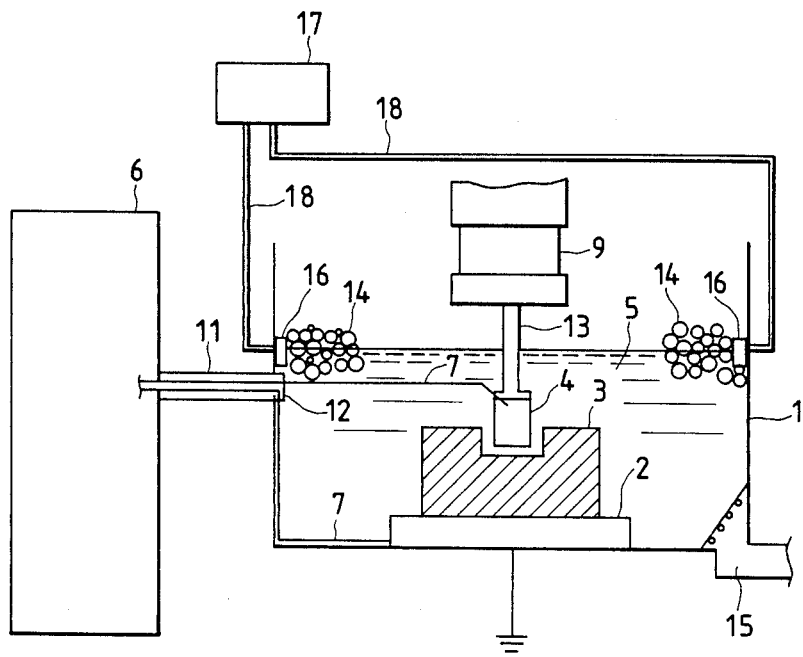
FIG. 5 is a sectional view showing a state of the second embodiment in which no radio wave shielding is required.

FIG. 4 is a sectional view showing a second embodiment of the invention, and FIG. 5 is a sectional view showing a state of the embodiment in which no electromagnetic shielding is required. In FIGS. 4 and 5, parts corresponding functionally to those which have been described with reference to FIG. 5 are therefore designated by the same reference numerals. In these figures, reference numeral 1 designates an electrically conductive machining reservoir; and 16, a plurality of electromagnets, eight for instance, arranged on the inner walls of the machining reservoir 1 at equal intervals in such a manner that they are flush with the surface of the machining solution 5. Each of the electromagnets has a surface made of electrically conductive material, and a coil and a core inside which are insulated from the surface. Further in FIGS. 2 and 3, reference numeral 17 designates an electromagnet control device for controlling the on-off-operation and the magnetic force of each electromagnet; and 18, electromagnet control lines through which the electromagnets are connected to the electromagnet control device 17.

The operation of the second embodiment thus constructed will be described with reference to FIGS. 4 and 5.

The electrode 4 and the workpiece 3 are placed in the machining solution 5 with a small gap therebetween. Under this condition, a number of ferrite beads 14 are floated on the surface of the machining solution 5 in such a manner that they covers the entire surface of the machining solution 5. Thereafter, the electromagnet control device 17 is operated to cause the eight electromagnets to form weak magnetic fields around themselves. As a result, the number of ferrite beads 14, being excited by the magnetic fields, are spread over the entire surface of the machining solution 5 in such a manner that they are in contact with one another, thus separating the surface of the machining solution 5 from the outside space. In this case, in a pair of electromagnets 16 and 16 which are diametrically opposed to each other, the N pole of one of the electromagnet is confronted with the S pole of the other. On the other hand, the number of ferrite beads 14 in contact with one another are electrically connected to the machining reservoir 1 through the surfaces of the electromagnets 16, so that they are at the same potential as the machining reservoir 1 grounded. Thus, the inside of the machining reservoir 1 is shielded by the machining reservoir 1 and the number of ferrite beads 14.

When a pulse voltage from the machining power unit 6 is applied across the workpiece 3 and the electrode 4 through the feeder lines 7, spark discharge takes place in the gap between the workpiece 3 and the electrode 4; that is, machining current flows in a loop consisting of one of the feeder lines 7, the electrode 4, the gap, the workpiece 3 and the other feeder line 7. During the electric discharge machining operation, electromagnetic waves are radiated from the gap between the workpiece 3 and the electrode 4 and from the electric power supplying feeder lines 7. The electromagnetic waves thus radiated are shielded by the electromagnetic shielding member which is made up of the number of ferrite beads and the feeder shield 11; that is, they are grounded through the electromagnetic shielding member. The reason why the ferrite beads are used as the shielding floats resides in that ferrite, being electrically conductive and ferromagnetic material, is most effective in shielding electromagnetic waves.

When, after an electric discharge machining operation has accomplished, the electromagnetic shielding of the machining reservoir 1 is unnecessary—for instance when the machining solution 5 is to be discharged, first the electromagnet control device 17 is operated to deenergize the electromagnets 16 to thereby release the ferrite beads; that is, to disconnect the ferrite beads from one another. Under this condition, the electromagnet control device 17 is operated to cause the electromagnets 16 to output strong magnetic force to thereby attract the ferrite beads 14 floating on the surface of the machining solution 5 as shown in FIG. 5. Thus, the machining solution 5 can be discharged from the machining reservoir 1 through the solution discharging outlet 15 formed in the bottom of the machining reservoir 1.

When it is required to electromagnetically shield the inside of the machining reservoir 1 to start an electric discharge machining operation again, the machining solution 5 is supplied into the machining reservoir 1 until its surface reaches the level of the electromagnets 16. Under this condition, the electromagnet control device 17 is operated to deenergize the electromagnets 16 to allow the ferrite beads 14 to float on the surface of the machining solution in the machining tank, and the electromagnet control device 17 is operated again to cause the electromagnets 16 to form weak magnetic fields similarly as in the above-described case. Thus, the inside of the machining reservoir has been electromagnetically shielded for prevention of the leakage of the electromagnetic waves.

In each of the above-described first and second embodiments, the shielding floats are the ferrite beads which are made hollow to float on the machining solution; however, modifications are possible without departing from the essential scope of the present invention. The ferrite beads may be replaced with floats of ferrite which are each made in the form of a film or thin disc. It goes without saying that the ferrite beads may be replaced with particles which are smaller in specific gravity than the machining solution 5 and are coated with ferrite. That is, any shielding floats may be employed, which are made of a material which is made of an electrically conductive and ferromagnetic material and designed to float on the machining solution 5.

As was described above, in the electric discharge machining apparatus of the invention, a number of shielding floats at least the surfaces of which are made of a magnetic material high in magnetic permeability are floated on the surface of the machining solution in the machining reservoir in such a manner that the shielding floats are in contact with one another and in contact with the side walls of the machining reservoir, to thereby magnetically shield the inside of the machining reservoir. Therefore, during an electric discharge machining operation, the electromagnetic waves radiation from the gap between the electrode and the workpiece, being magnetically shielded, will never leak outside the machining reservoir. That is, the machining reservoir serves as the shield room of the conventional electric discharge machining apparatus. Therefore, it follows that not only the space required for the shield room, but alsio the equipment concerning the shield room can be eliminated. That is, the radio interference due to the radiation of electromagnetic waves can be prevented with simple means at low cost.

Furthermore, in the electric discharge machining apparatus of the invention, a plurality of electromagnets are disposed on the inner walls of the machining reservoir in such as manner that they are flush with the surface of the machining solution in the machining reservoir and their surfaces are at the same potential as the machining reservoir, and a number of shielding floats which are made of an electrically conductive and ferrite material are floated on the surface of the machining solution in the machining reservoir in such a manner that they cover the entire surface of the machining solution. Under this condition, the electromagnet control device is operated to cause the electromagnets to form weak magnetic fields, so that the shielding floats in contact with one another on the surface of the machining solution and the machining reservoir held at the same potential as the shielding floats provide electromagnetic shielding means which prevents the leakage of the electromagnetic waves radiated from the gap between the electrode and the workpiece during machining. Thus, similarly the machining reservoir serves as the shield room of the conventional electric discharge machining apparatus, with the result that the radio interference due to the radiation of electromagnetic waves during machining can be prevented with simple means low in manufacturing cost.

Furthermore, in the invention, the magnetic forces of the electromagnets on the inner walls of the machining reservoir can be controlled by the electromagnet control device, so as to activate or release the electromagnetic shielding means composed of the machining reservoir and the number of shielding floats with ease.

What is claimed is:

1. An electric discharge machining apparatus in which a machining electrode and a workpiece to be machined are placed in a machining solution in a machining reservoir, and a pulse voltage is applied through a power supplying line between said machining electrode and said workpiece to cause spark discharge therebetween to thereby machine said workpiece, comprising:
   shielding means for shielding an interior of said machining reservoir magnetically, which comprises a plurality of shielding floats at least the surfaces of which are made of a magnetic material high in magnetic permeability, said shielding floats being floated to cover a surface of said machining solution in said machining reservoir in such a manner that said shielding floats are in contact with one another and in contact with a side wall of said machining reservoir and said machining reservoir being made of a magnetic material high in magnetic permeability.

2. An electric discharge machining apparatus as defined in claim 1 wherein said power supplying line is shielded magnetically and said shielding means forms a closed magnetic circuit with said reservoir.

3. An electric discharge machining apparatus as defined in claim 1 wherein said shielding floats are hollow ferrite beads.

4. An electric discharge machining apparatus as defined in claim 1 further comprising:
   a plurality of electromagnets which are disposed on the inner side wall of said machining reservoir in such a manner that said electromagnets are flush with the surface of the machining solution in said machining reservoir, the surfaces of said electromagnets being of the same potential as said machining reservoir; and
   electromagnet control means for switching said electromagnets and for controlling the magnetic force of each of said electromagnets;
   said shielding floats being electrically conductive and ferromagnetic, and said shielding floats being floated on the machining solution in said machining reservoir in such a manner as to cover the entire surface of the machining solution in said machining reservoir when said electromagnet control means controls sid electromagnets to generate weak magnetic field.

5. An electric discharge machining apparatus as defined in claim 4 wherein said power supplying line is shielded magnetically and said shielding means forms a closed magnetic circuit with said reservoir.

6. An electric discharge machining apparatus as defined in claim 4 wherein said shielding floats are hollow ferrite beads.

* * * * *